United States Patent [19]

Chalmers

[11] Patent Number: 4,509,449
[45] Date of Patent: Apr. 9, 1985

[54] TEMPERATURE/TIME LIMIT INDICATOR

[76] Inventor: Stephen P. Chalmers, 21 Martha's La., Scituate, Mass. 02066

[21] Appl. No.: 439,615

[22] Filed: Nov. 5, 1982

[51] Int. Cl.³ .................. G01K 3/00; G01K 11/08
[52] U.S. Cl. .................. 116/218; 374/102; 116/281
[58] Field of Search ............ 116/218, 217, 219, 216, 116/281, 324, 312; 374/160, 102, 108, 142; 73/744

[56] References Cited

U.S. PATENT DOCUMENTS

| | | | |
|---|---|---|---|
| 646,217 | 3/1900 | Hollingsworth | 374/135 |
| 2,472,757 | 6/1949 | Raspet | 374/135 |
| 2,788,282 | 4/1957 | Hammond | 116/218 |
| 2,915,405 | 12/1959 | Hammond | 116/218 |
| 3,339,417 | 9/1967 | Richard | 73/170 A |
| 3,414,415 | 12/1968 | Broad | 116/219 |
| 3,759,103 | 9/1973 | Volk | 116/218 |
| 3,965,741 | 6/1976 | Wachtell | 374/160 |
| 4,143,617 | 3/1979 | Youngren | 374/160 |

FOREIGN PATENT DOCUMENTS 558460  6/1958  Canada .................. 116/281

*Primary Examiner*—Richard R. Stearns
*Assistant Examiner*—Denis E. Corr
*Attorney, Agent, or Firm*—Donald W. Meeker

[57] ABSTRACT

An elongated container, open at end, is nearly filled with frozen fluid. Urethane foam insulation around the container admits access only to the open end of the container with the frozen fluid level below the insulation. An elongated heat conducting indicator member fits loosely within the container so that fluid may pass therebetween. An elastic band over the end of the indicator/conductor and around the base of the insulation maintains an end of the indicator/conductor in contact with the frozen fluid. The indicator/conductor is calibrated in degree-hours or other temperature-time units. The indicator/conductor may be a hollow flat-bottomed tube with air inside acting as the heat conductor from the exterior air to the contact end of the block of frozen fluid. An alternate indicator/conductor may be a thin heat conducting member surrounded by insulation and contacting a heat receptor at the outside end and a heat transmitter at the inside end contacting the frozen fluid, both of which are broader than the thin conducting member. The entire limit indicator may be encased in a thin plastic shell to prevent tampering with the device. A spring or elastic may be used within the shell to maintain contact. A membrane may contain the fluid until frozen, when the membrane may be broken for contacting the indicator/conductor to the frozen fluid. The indicator/conductor may be secured in place by a pin therethrough against the shell. A simple heat conducting rod is another alternate type of indicator/conductor member.

16 Claims, 4 Drawing Figures

TEMPERATURE/TIME LIMIT INDICATOR

BACKGROUND OF THE INVENTION

1. Technical Field

The present invention relates to temperature/time measuring devices and in particular to safety devices for indicating the degree of exposure of perishable goods above a specified temperature for a duration of time and to disposable indicators of this type.

2. Background Art

Because of the need to maintain perishable goods below specified temperatures to maintain their value, it is desirable to know the history of such goods regarding their exposure to higher temperatures which might damage the goods; long exposures to temperatures slightly higher than those specified safe and even short exposure to temperatures well above those specified safe. In transporting foods, drugs or other perishables, it is especially valuable to the recipient of the goods to know that they have been maintained in an appropriate condition during transportation and storage. Occasionally the transporting vehicles or storage facilities break down and alter the temperatures of perishable goods to spoil them.

Most inexpensive prior art devices which employ a frozen fluid and an indicator pressing against it do not provide an accurate means of indicating the history of perishable goods because the entire devices are exposed to the atmosphere. The frozen fluids desolidify much more quickly if the entire frozen fluid is exposed to the ambient temperature and the frozen fluid may melt or sublime around its entire periphery and thereby deform in shape. Gross distortions of the history of the perishable goods result because the pressure of an indicator against the frozen fluid as it desolidifies may push the remaining solid mass aside, tilt the mass or split the mass giving a very inconsistent reading on the indicator with inconsistent jumps in the movement of the indicator.

None of the prior art devices provide a specific means for conducting the ambient temperature to the frozen fluid, further decreasing the accuracy of the limit indicator because of random conduction of the ambient temperature.

Some of the prior art devices do give accurate temperature/time readings but use very elaborate and expensive sensing devices involving instrumentation.

Few prior art temperature limit indicators provide a security means to prevent tampering with the indicator and thereby insure an accurate reading and none provide combined security with heat flow and insulated fluid.

Many prior art devices must be assembled after freezing the fluid making activation a complex procedure.

DISCLOSURE OF INVENTION

The present invention gives an accurate measure of temperature multiplied by time, providing an insulation layer around the frozen measuring fluid and a heat conducting indicator contacting the frozen fluid at one small end, allowing exposure to ambient atmospheric temperature only at the contact area with the moving indicator. This insures melting or subliming from one end which produces accurate movement of the indicator proportional to the amount of melting or subliming.

By combining the temperature conducting and temperature/time indicating functions into one moving indicator/conductor member which contacts the frozen fluid at one end where controlled melting or sublimation of the frozen fluid takes place, accurate transmission of the ambient temperature to the frozen fluid is provided giving precise movement of the indicator/conductor.

Using the very simplest materials, the present limit indicator provides a very inexpensive device which is intended to be disposed of after one usage. An elastic band or other simple tension member provides the force to move the indicator into the container as the frozen fluid melts. Two basic tubes of very inexpensive material, such as plastic, may be used as the main components. A larger diameter tube serves as a container for the frozen fluid and a smaller diameter tube slides within the container tube to serve as a combined temperature/time indicator and heat conductor. Insulation around the container portion may be a very inexpensive and lightweight foam material such as urethane foam. Low-cost casing is provided by utilizing a mass-produced formed plastic case.

A sealed casing around the limit indicator insures that the device will not be tampered with after activation so that an accurate reading is insured.

Providing a frangible seal of thin synthetic material to retain the fluid in the container before freezing and providing a simple removable pin through the indicator/conductor member to prevent its movement until the fluid is frozen, in combination, enable the device to be shipped and sold in non-frozen condition, and easily prepared for use without altering the fluid or indicator. After freezing the fluid and placing the limit indicator in its use environment, the pin may be pulled and the indicator/conductor member pushed to break the seal and contact the frozen fluid, thus, activating the device within its sealed casing. Containing the fluid separate from the indicator allows shipping without regard to orientation or temperature and also allows activation and use without regard to orientation or temperature.

BRIEF DESCRIPTION OF THE DRAWINGS

These and other details and advantages of my invention will be described in conjunction with the accompanying drawings, which are furnished only by way of illustration and not in limitation of the invention, and in which drawings.

BEST MODE FOR CARRYING OUT THE INVENTION

Figure 1:
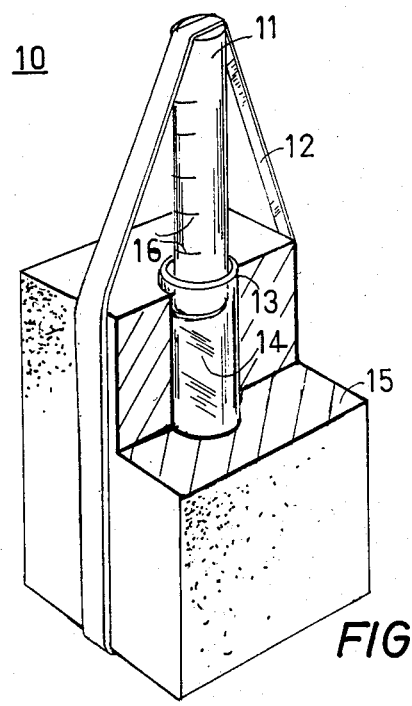
FIG. 1 is a perspective view of the limit indicator in partial section.
Figure 2:
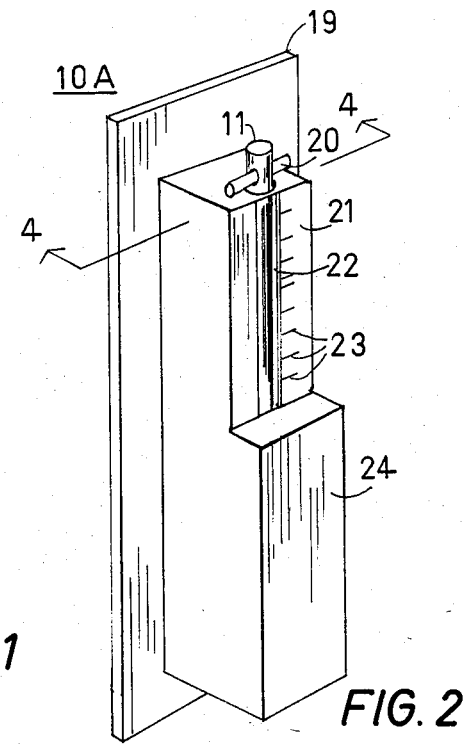
FIG. 2 is a perspective view of the limit indicator sealed within a casing.

In FIG. 1 the basic temperature/time limit indicator 10 is comprised of five basic elements. A hollow cylindrical tube constitutes the container 13 which is nearly full of frozen fluid 14. A second hollow tube, smaller in diameter than the first, constitutes an indicator/conductor member 11 fitting loosely within the container 13 with sufficient room therebetween to allow the desolidified fluid to pass out of the container. The container is encompassed by a foam insulation 15 with only an opening for the top of the container. Urethane foam provides the best R-value for the price. An elastic band 12 or other tension member is stretched over the open end of the indicator/conductor member and around the insulation.

The elastic band 12 exerts a force on the top open end of the indicator/conductor member which will cause the flat bottom closed end of the indicator/conductor member to maintain contact with the frozen fluid 14 within the container 13.

Because ambient air fills the indicator/conductor, any elevation in temperature of the ambient air above the freezing temperature of the frozen fluid will cause the frozen fluid 14 contacted by the end of the indicator/conductor member 11 to melt or sublime. As the frozen fluid desolidifies, the indicator/conductor member 11 moves further into the container 13 (forced by the elastic band 12) at a rate proportional to the melting or sublimation. Calibrations 16 on the indicator/conductor member give an accurate reading in degree-hours or other appropriate temperature-time unit.

Figure 3:
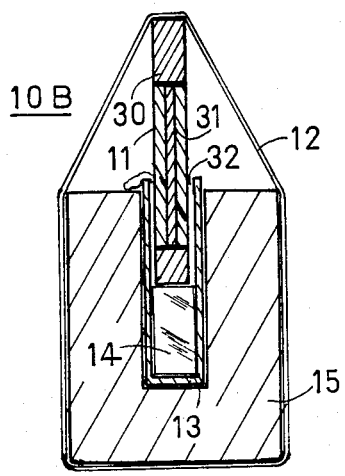
FIG. 3 is a cross-sectioned view of an alternate embodiment of the invention provided with an insulated heat conducting rod as an indicator/conductor member, shown partially penetrated into the container.
Figure 4:
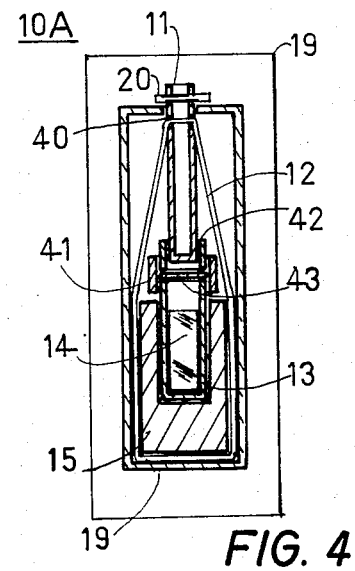
FIG. 4 is a sectional view of the invention within the casing taken through 4—4 of FIG. 2.

In FIGS. 3 and 4 the limit indicator 10A is shown with an exterior casing 19 of any inexpensive mass-produced formed plastic such as a blister pack, stamped, thermoformed or vacuum formed plastic. The casing entirely encloses the insulated container portion and substantially encloses the indicator/conductor member with only a small portion of the open end of the indicator/conductor member protruding beyond the casing. A transverse opening is made through the indicator/conductor member near the end and a pin 20 removably passed therethrough to retain the indicator/conductor member in place until the limit indicator is prepared for use by freezing the fluid.

In this case the tension member 12 is secured through a notch 40 provided in the indicator/conductor member within the casing. The tension member is stretched around the insulation 15.

The casing is provided with a portion 22 for visually monitoring the movement of the indicator/conductor member within the casing. An elongated opening 22 or transparent window in the casing may serve as the visual monitoring means. Calibrations 23 in temperature-time units such as degree-hours may be marked or formed by conventional means on the casing along the edges of the visual monitoring portion or marked on the indicator/conductor member.

In FIG. 4 a frangible seal 43, which may be a thin sheet of plastic, is secured across the container near the top to seal the fluid within the container, allowing the limit indicator to be shipped, stored and sold at any temperature and in any orientation without allowing the fluid to escape. The frangible seal 43 may be glued or attached by any other convenient means. Shown in FIG. 4, the seal 43 is stretched over the top of the container 13 and a sleeve 41 over the container secures the seal. An extension 42 of the container is then inserted in the sleeve to allow the bottom of the indicator/conductor member 11 to be maintained within the top of the container extension in alignment with the container, so that after freezing the fluid 14 and releasing the pin 20, the indicator/conductor member may pierce the frangible seal 43 and slide into the container to contact the frozen fluid.

In FIG. 3 a cross-sectional view of an alternate embodiment of the indicator/conductor shows a thin heat conducting central core 30 surrounded by insulation 31. The central core connects a broader heat receptor 33 at the outside end to a broader heat transmitter 34 at the inside end in contact with the frozen fluid. The thin insulated heat conductor with a large heat receptor and transmitter provide a very efficient means of heat flow. The length of the indicator/conductor between the top of the central core and the bottom of the heat transmitter should equal the entire length of the container so that the receptor 33 never falls within the confines of the container insulation 15. The indicator-conductor 11A is shown partially advanced into the container indicating that some of the frozen fluid has melted or sublimed.

The frozen fluid 14 may be any non-toxic liquid or gas which melts or sublimes respectively at the upper temperature limit for insuring the quality of the perishable goods with which the invention is used, by placing the limit indicator with the perishables in the storage or transportation compartment (a freezer for food for example). Should the compartment be exposed to temperature higher than the desired limit, the frozen fluid will melt or sublime from the contact end and the indicator/conductor will advance into the container at a rate proportional to the melting or subliming. No movement of the indicator/conductor means that the device has been maintained below the proper limit.

It is understood that the preceding description is given merely by way of illustration and not in limitation of the invention and that various modifications may be made thereto without departing from the spirit of the invention as claimed.

I claim:

1. A temperature-time limit indicator comprising:
   an elongated container provided with an opening at one end, which container holds a measured volume of frozen fluid which frozen fluid is known to desolidify at a specified desired temperature;
   a temperature insulating layer surrounding the container except for the opening;
   an elongated temperature indicating member fitting in a loosely slidable manner within the container through the opening;
   a means of exerting a force on the indicating member pressing it into the container against the frozen fluid causing the temperature indicating member to maintain contact with the solid frozen fluid as the frozen fluid desolidifies, moving the indicating member into the container at a measured rate relative to temperature and time of desolidification;
   a casing enclosing the container and the insulating layer, and substantially enclosing the temperature indicating member with only a small portion of one end of the temperature indicating member protruding beyond the casing and one portion of the casing permitting the visual monitoring of the movement of the temperature indicating member wherein the protruding end of the temperature indicating member is provided with a transverse opening therethrough and a rigid pin is removably inserted through the transverse opening with the ends of the pin extending beyond the opening and resting against the casing to prevent movement of the temperature indicating member into the container until the limit indicator is prepared for use.

2. The limit indicator of claim 1 wherein the casing is further provided along the visual monitoring portion with calibrations in temperature/time units.

3. The limit indicator of claim 1 wherein the force exerting means comprises a spring between the indicator member and the casing.

4. The limit indicator of claim 1 wherein the force exerting means comprises an elastic band between the indicator member and the casing.

5. The limit indicator of claim 1 wherein the force exerting means comprises a tension member stretched and secured near the protruding end of the temperature indicating member.

6. The invention of claim 5 wherein the tension member includes an elasticized band.

7. The limit indicator of claim 1 further comprising a frangible seal between the temperature indicating member and the fluid which seal retains the fluid whether frozen or liquid until the seal is broken to prevent movement of the temperature indicating member into the container as well as prevent spillage of the fluid, until after the limit indicator is prepared, and ready for use.

8. The limit indicator of claim 1 wherein a clearance space between the indicator member and the container is sufficiently wide to permit the desolidified fluid to escape through the clearance space.

9. A temperature/time limit indicator comprising:
an insulated container provided with a single opening at one end;
a measured volume of fluid within the container in a frozen state, which fluid is known to desolidify at a selected temperature;
a combined indicator and heat conductor member which fits slidably within the container and which combined member transmits heat from the atmosphere to the frozen fluid;
a means of maintaining the indicator/conductor member against the frozen fluid;
a sealed casing enclosing the container and insulation, and substantially enclosing the indicator/conductor member with only a small portion of the open end of the indicator/conductor member protruding beyond the casing, and one portion of the casing permits visual monitoring of the motion of the indicator/conductor member within the casing, wherein the protruding end of the indicator/conductor member is provided with a transverse opening therethrough and a rigid pin is removably inserted through the transverse opening with the ends of the pin extending beyond the indicator/conductor member and resting against the casing to prevent movement of the indicator/conductor member into the container until the limit indicator is prepared for use.

10. The limit indicator of claim 9 wherein the visual monitoring portions of the casing is calibrated in temperature/time units.

11. The limit indicator of claim 9 wherein the forcing means comprises a spring between the indicator/conductor member and the casing.

12. The limit indicator of claim 9 wherein the forcing means comprises an elastic band between the indicator/conductor member and the insulated container.

13. The limit indicator of claim 9 wherein the force exerting means comprises a tension member stretched and secured near the protruding end of the indicator/conductor member.

14. The invention of claim 13 wherein the tension member includes an elasticized band.

15. The limit indicator of claim 9 further provided with a frangible seal between the indicator/conductor member and the fluid which seal retains the fluid whether frozen or liquid until the seal is broken, so as to prevent movement of the temperature indicator/conductor member into the container until after the limit indicator is prepared, and ready for use.

16. The limit indicator of claim 9 wherein a clearance space between the indicator/conductor member and the container is sufficiently wide to permit the desolidified fluid to escape through the clearance space.

* * * * *